US012032109B2

(12) United States Patent
Boelle et al.

(10) Patent No.: US 12,032,109 B2
(45) Date of Patent: Jul. 9, 2024

(54) METHOD FOR ACQUIRING A SEISMIC DATASET OVER A REGION OF INTEREST (71) Applicant: TOTAL SA, Courbevoie (FR)

(72) Inventors: Jean-Luc Boelle, Pau (FR); Isabella Masoni, Pau (FR); Rémi Estival, Pau (FR); Sandra Barbouteau, Pau (FR)

(73) Assignee: TOTAL SA, Courbevoie (FR)

(*) Notice: Subject to any disclaimer, the term of this patent is extended or adjusted under 35 U.S.C. 154(b) by 19 days.

(21) Appl. No.: 16/620,463

(22) PCT Filed: Jun. 7, 2018

(86) PCT No.: PCT/EP2018/064989
§ 371 (c)(1),
(2) Date: Dec. 6, 2019

(87) PCT Pub. No.: WO2018/224585
PCT Pub. Date: Dec. 13, 2018

(65) Prior Publication Data
US 2020/0183027 A1 Jun. 11, 2020

(30) Foreign Application Priority Data
Jun. 8, 2017 (EP) .................................. 17305684

(51) Int. Cl.
G01V 1/00 (2024.01)
G01V 1/104 (2006.01)
(Continued)

(52) U.S. Cl.
CPC .............. *G01V 1/001* (2013.01); *G01V 1/003* (2013.01); *G01V 1/104* (2013.01); *G01V 1/181* (2013.01);
(Continued)

(58) Field of Classification Search
USPC .......................................................... 367/38
See application file for complete search history.

(56) References Cited

U.S. PATENT DOCUMENTS 3,517,316 A 6/1970 Anderson et al.
3,824,532 A 7/1974 Vandierendonck
(Continued)

FOREIGN PATENT DOCUMENTS

EP 0 209 782 A2 1/1987
EP 1 879 031 A2 1/2008
(Continued)

OTHER PUBLICATIONS

International Search Report issued in corresponding International Patent Application No. PCT/EP2018/064989 dated Nov. 12, 2018.
(Continued)

Primary Examiner — James R Hulka
(74) Attorney, Agent, or Firm — TROUTMAN PEPPER HAMILTON SANDERS LLP (57) ABSTRACT The method comprises providing at least one seismic source in a seismic source area and providing a plurality of seismic receivers in said seismic source area, said method comprising measuring a first type of ground vibrations induced in a subsurface of the area of interest by the at least one seismic source with the plurality of seismic receivers. The method further comprises measuring with the plurality of seismic receivers at least one second type of ground vibrations induced by a mechanical source different from the or from each seismic source and analyzing the second type of ground vibrations to determine at least one information among: a physical parameter of the subsurface and/or, a presence of human and/or an animal and/or a vehicle.

19 Claims, 4 Drawing Sheets (51) Int. Cl.
*G01V 1/18* (2006.01)
*G01V 1/22* (2006.01)
*G01V 3/08* (2006.01)

(52) U.S. Cl.
CPC ............... *G01V 1/223* (2013.01); *G01V 3/08* (2013.01); *G01V 2210/1212* (2013.01); *G01V 2210/144* (2013.01); *G01V 2210/72* (2013.01)

(56) References Cited

U.S. PATENT DOCUMENTS

| | | | |
|---|---|---|---|
| 3,940,733 A | 2/1976 | Johnson et al. | |
| 4,005,384 A * | 1/1977 | Pryor, Jr. | G08G 1/04 367/901 |
| 4,368,438 A | 1/1983 | Steinstra | |
| 5,969,608 A | 10/1999 | Sojdehei et al. | |
| 5,974,881 A | 11/1999 | Donskoy et al. | |
| 6,083,165 A | 7/2000 | Kaplan | |
| 6,370,481 B1 | 4/2002 | Gamble | |
| 6,536,062 B2 * | 3/2003 | Borza | F41H 11/12 367/87 |
| 7,122,783 B1 | 10/2006 | Pastore, Jr. et al. | |
| 7,377,357 B2 | 5/2008 | Duren et al. | |
| 7,961,094 B2 * | 6/2011 | Breed | G08B 13/1663 340/541 |
| 8,077,036 B2 * | 12/2011 | Berger | G08B 13/1663 340/566 |
| 8,833,509 B2 * | 9/2014 | Meier | E21B 43/01 181/111 |
| 9,239,397 B2 * | 1/2016 | Thompson | G01V 11/007 |
| 10,073,184 B2 * | 9/2018 | Faber | G01V 1/288 |
| 2002/0124653 A1 | 9/2002 | Borza | |
| 2002/0163857 A1 * | 11/2002 | Bahorich | G01V 1/147 367/14 |
| 2003/0014199 A1 | 1/2003 | Toomey | |
| 2006/0076183 A1 | 4/2006 | Duren et al. | |
| 2008/0094212 A1 | 4/2008 | Breed | |
| 2009/0309725 A1 | 12/2009 | Berger et al. | |
| 2013/0265851 A1 | 10/2013 | Faber et al. | |
| 2014/0027122 A1 | 1/2014 | Meier et al. | |
| 2015/0103626 A1 | 4/2015 | Thompson et al. | |
| 2015/0309195 A1 | 10/2015 | Sallas | |

FOREIGN PATENT DOCUMENTS

| | | |
|---|---|---|
| EP | 3 236 293 A1 | 10/2017 |
| FR | 1.597.645 | 8/1970 |
| GB | 2 347 744 A | 9/2000 |
| JP | 2000-284061 A | 10/2000 |
| NL | 8005692 A | 5/1982 |
| RU | 2 337 405 C1 | 10/2008 |
| WO | 86/02459 A1 | 4/1986 |
| WO | 95/20769 A1 | 8/1995 |
| WO | 99/04287 A1 | 1/1999 |
| WO | 99/09433 A1 | 2/1999 |
| WO | 2005/050580 A2 | 6/2005 |
| WO | 2006/129821 A1 | 12/2006 |
| WO | 2010/090752 A1 | 8/2010 |
| WO | 2010/118233 A2 | 10/2010 |
| WO | 2015/182608 A1 | 12/2015 |
| WO | 2017/048347 A1 | 3/2017 |

OTHER PUBLICATIONS

OGP Standard "OGP-Helicopter guideline for land seismic and helirig operations" International Association of Oil & Gas Producers Report 420, Version 1.1, 82 pages submitted, Jun. 2013.

* cited by examiner

METHOD FOR ACQUIRING A SEISMIC DATASET OVER A REGION OF INTEREST

CROSS REFERENCE TO RELATED APPLICATIONS

This is a U.S. National Phase Application under 35 U.S.C. § 371 of International Patent Application No. PCT/EP2018/064989, filed Jun. 7, 2018, which claims priority of European Patent Application No. 17305684.7, filed Jun. 8, 2017. The entire contents of which are hereby incorporated by reference.

FIELD OF THE INVENTION

The present invention concerns a method for acquiring a seismic dataset over a region of interest comprising providing at least one seismic source in a seismic source area of the region of interest and providing a plurality of seismic receivers in said seismic source area, said method further comprising measuring a first type of ground vibrations induced in a subsurface of the area of interest by the at least one seismic source with the plurality of seismic receivers.

The region of interest is notably a region with a difficult access. The region in particular comprises a high density of vegetation, such as a forest, such as a tropical forest. Also, the region may comprise rugged terrain such as hills (for example foothills), cliffs and/or mountains. Also, the region may comprise dangerous to access areas, such as areas with unexploded ordinances (UXOs).

The method can also be applied to any region of interest.

BACKGROUND

The seismic survey acquisition is one of the main geophysical methods carried out for exploration in oil and gas industry. The geophysical measurements obtained during such a survey are critical in building a subsurface image representative of the geology of the region of interest, in particular to determine the location of potential reservoirs of oil and gas.

Such seismic survey is for example conducted by deploying seismic sources and seismic receivers, such as geophones, on the ground of the region of interest. The seismic receivers are able to record mainly the reflections of the seismic waves produced by the seismic sources on the different layers of the earth in order to build an image of the subsurface.

The seismic survey generally requires sources and a large amount of receivers in the ground at various locations, along generally several profiles to create dense arrays of seismic sources and seismic receivers.

The quality of the subsurface image obtained after the processing of the seismic survey data is generally a function of the surface density of seismic sources and/or of seismic receivers. In particular, a significant number of seismic receivers have to be put in place in the ground to obtain an image of good quality. This is in particular the case when a three-dimensional image is required.

Placing seismic sources and seismic receivers in a remote region of interest may be a tedious, dangerous and expensive process. In particular, when the region is barely accessible, such as in a tropical forest and/or in a region with uneven terrain and/or in a region with UXOs, the sources and the receivers have to be carried at least partially by foot by teams of operators. In many cases, clearings have to be opened in the forest to place on the ground the relevant equipment and operators. Trails must then be cleared in the forest to put in place the receivers.

These tasks create a strong environmental impact in the region of interest and may induce significant health and safety risks for the operators, especially during the setting-up of the receivers and of the seismic sources.

The set-up of the seismic receivers and/or the seismic sources in the ground is an extensive process which requires drilling the ground, and in the case of the receivers, ensuring that the coupling between the receiver and the ground is adequate.

For example, outside of the seismic source areas, the seismic receivers are carried by a flying vehicle such as an unmanned aerial vehicle. The flying vehicle is flown above the location at which the receiver should be implanted in a dropping area. Then, the seismic receivers are successively dropped from the flying vehicle and fall to the ground.

This method of setting-up the seismic receivers allows reducing the impact on the environment by limiting the clearing of new trails in the forest and reducing the associated risks of injuries for the operators. However, this method increases sensibly another type of risks for persons or animals. Indeed, dropping the seismic receivers may cause severe hazards to the humans and/or animals which circulate in the region of interest. If the seismic receiver falls on a human and/or an animal, it can cause at best, a severe injury and at worse, a lethal injury.

The same problem arises during the carrying out of the ground survey when sources are used to generate a seismic stimulus. The sources often comprise explosives. Human and/or animal should be prevented from entering the shooting area around the sources.

One aim of the invention is to obtain a method which allows reducing the risks relative to health and safety of the operators, limiting impact on the environment and improving the global quality of the results of the seismic survey.

SUMMARY

To this aim, the subject-matter of the invention is a method of the above-mentioned type, further comprising measuring with the plurality of seismic receivers at least one second type of ground vibrations induced by a mechanical source different from the or from each seismic source and analyzing the second type of ground vibrations to determine at least one information among: a physical parameter of the subsurface and/or, a presence of human and/or an animal and/or a vehicle.

The method according to the invention may comprise one or more of the following features, taken solely or according to any potential technical combination:
- the second type of ground vibrations is induced by a drilling tool during a setup of the at least one seismic source in the seismic source area,
- the physical parameter of the subsurface is a density and/or a wave velocity of the subsurface,
- the method further comprises positioning seismic receivers out of the seismic source area, the density of the seismic receivers in the seismic source area being greater than the density of seismic receivers out of the seismic source area,
- the method further comprises monitoring the presence and/or the location of said human and/or animal and/or vehicle in real time in the region of interest, based on the analysis of the second type of vibrations measured with the plurality of seismic receivers;

the monitoring of the presence and/or the location of said human and/or animal and/or vehicle in real time includes recording at least an event of ground vibration resulting from a movement on the ground in the region of interest, at the plurality of seismic receivers and analyzing the time delay in the recording of the event between the plurality of seismic receivers, the method further comprises triggering an alarm when the presence of the human and/or the animal and/or the vehicle is detected in the region of interest, the method further comprises stopping the positioning of the plurality of seismic receivers positioned out of the seismic source area when the presence of the human and/or the animal and/or the vehicle is detected in the region of interest, the method further comprises inducing a seismic signal with the at least one seismic source and monitoring the at least one seismic source signature using the plurality of seismic receivers during the acquisition of the seismic dataset, the method further comprises positioning at least two seismic sources in the seismic source area and positioning the plurality of seismic receivers according to a geometric pattern contained in the seismic source area, the seismic source area has a square or a rectangular shape having four corners and said method further comprising positioning a seismic source in each corner of the seismic source area and positioning two plurality of seismic receivers along at least two axes contained in the seismic source area, the method further comprises measuring at least one additional physical parameter of the ground with a plurality of additional sensors installed in the seismic source area, the plurality of additional sensors are magneto-telluric sensors and the method further comprises calculating a large-scale electrical conductivity model based on the magneto-telluric measurements provided by said magneto-telluric sensors, the method further comprises transmitting in real-time the first type of ground vibrations measurements and/or the second type of ground vibrations measurements and/or the additional physical parameter measurements to a base camp located in the region of interest, using at least one communication antenna installed in the seismic source area, the seismic source is configured to generate seismic energy;

the seismic source comprises an explosive and/or a hammer and/or a vibrator.

BRIEF DESCRIPTION OF THE DRAWINGS

The invention will be better understood, based on the following description, given solely as an example, and made in reference to the following drawings, in which.

DETAILED DESCRIPTION OF THE DRAWINGS

Figure 1:
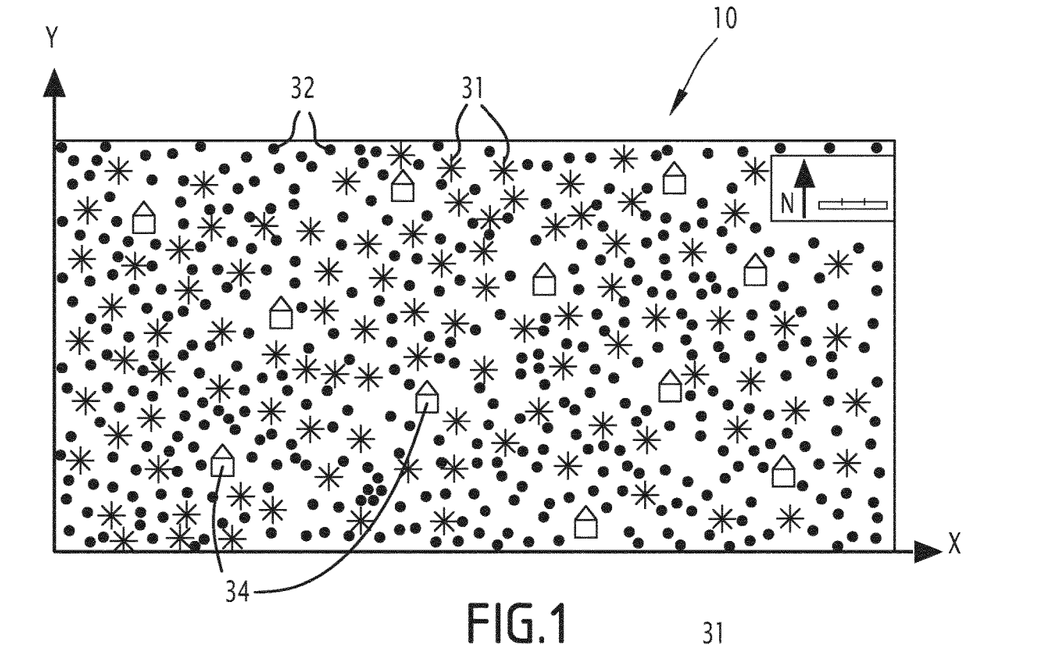
FIG. 1 is a schematic geographical view of a region of interest in which a seismic dataset is acquired by the method according to the invention.
Figure 2:
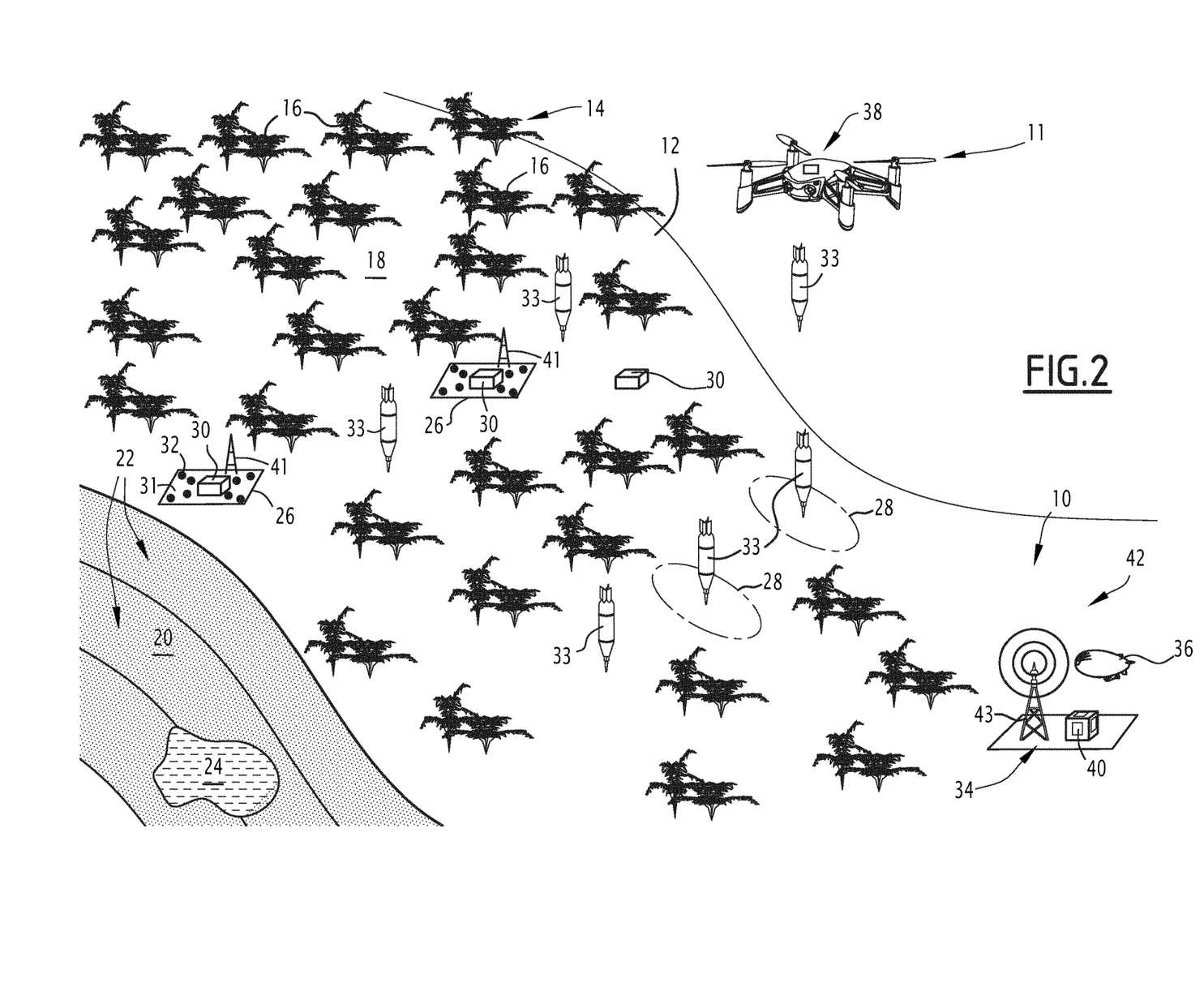
FIG. 2 is a schematic three-dimensional view of a part of the region of interest of FIG. 1.

FIG. 1 and FIG. 2 show respectively a schematic geographical map of projected coordinates of a region of interest 10 where a seismic survey acquisition is carried out and a three dimensional view of a part of the region of interest 10.

The region of interest 10 is for example a region having an uneven terrain 12. The uneven terrain 12 in particular comprises hills, mountains, cliffs or any type of rugged terrain. The region of interest 10 is for example located on foothills which are difficult to access.

The region of interest 10 further comprises vegetation 14. The vegetation 14 is for example a forest, in particular a tropical forest. It comprises a high density of vegetation 14, for example trees 16 forming a canopy 18 which covers a majority of the surface of the ground in the region of interest 10.

The subsurface 20 located below the ground comprises layers of geological formation 22 and potentially oil and gas reservoirs 24.

In the region of interest 10, the vegetation 14 defines a plurality of natural and/or artificial clearings 26. The vegetation 14 in the region of interest 10 also defines sky holes 28 in the canopy 18.

The clearings 26 are spread in the region of interest 10, at a distance generally comprised between 100 m and 500 m, preferentially 300 m, taken along the line of sight between two adjacent clearings.

The clearings 26 generally have a surface area greater than 25 $m^2$ at the ground level and generally greater than 900 $m^2$ at the top of the canopy 18. The seismic sources 30 can be put in place in the clearings 26.

A clearing 26 is for example defined in a OGP Standard "OGP-Helicopter Guideline for Land Seismic and Helirig operations—Report 420 version 1.1 June 2013.

Sky holes 28 are generally natural. They advantageously form a vertical "light tube" between the canopy 18 and the ground.

For example, the sky holes 28 have a minimal surface area greater than 1 $m^2$, preferentially greater than 3 $m^2$, and comprised for example between 3 $m^2$ and 20 $m^2$.

At least a sky hole 28 has a surface area which is smaller than the surface area of the clearings 26.

The seismic survey is a geophysical survey which comprises collecting geophysical measurements for determining physical properties of the subsurface 20 located in the region of interest 10 and/or for building an image of the subsurface 20, preferably a tridimensional image of the subsurface 20 based on the processing of the collected measurements.

The physical properties are typically the density and/or the wave velocities of the layers of geological formation 22.

The method according to the invention comprises positioning at least one seismic source 30 in a seismic source area 31 of the region of interest 10 and positioning a plurality of seismic receivers 32 in said seismic source area 31.

The method according to the invention comprises measuring the vibrations induced in a subsurface 20 of the area of interest 10 by the at least one seismic source 30 with the plurality of seismic receivers 32.

Advantageously, at least a part of the seismic source area 31 is located in a clearing 26. Typically, the seismic source area 31 has a 25 m×25 m size, advantageously centered on a clearing 26.

The seismic source area may comprise seismic sources 30 located in the centered part corresponding to the clearing 26 and/or seismic sources 30 located in the vicinity of the clearing 26.

The density of seismic source areas 31 laid in the region of interest is generally comprised between 10 seismic source areas per $km^2$ and 100 seismic source areas per $km^2$.

Each seismic source 30 is able to generate waves which propagate in the subsurface 20 and reflect at the interfaces of the layers of geological formation 22.

The seismic source 30 for example comprises an explosive, in particular dynamite, able to generate waves in the ground.

The seismic source 30 is typically inserted in a hole drilled into the ground, for example at a depth comprised between 0 meter and 100 meters, preferably between 5 meters and 80 meters.

For example, the hole is drilled using an unmanned ground vehicle such as a semi-automatic drilling platform.

In a variant, the seismic source 30 comprises a mechanical device such as a hammer, a vibrator . . . .

Each seismic source 30 is preferably carried at their locations without a ground vehicle from a base camp 34.

For example, at least a part of the seismic source 30 is carried at its location using an airborne vehicle 36 such as an airship or a helicopter, or an unmanned ground vehicle (UGV).

In a variant or in addition, at least a part of the seismic source 30 is carried at its location by foot by a team of operators.

A base camp 34 comprises for example a facilities adapted to house operators during the seismic survey and equipment for the seismic survey. The base camp 34 comprises a helipad and is typically used for management of the take-off and the landing.

The base camp 34 may be used for first aid (e.g. medevac).

Advantageously, the area of interest 10 comprises a plurality of base camps 34 spread in the whole surface of the area of interest 10.

Each base camp 34 typically comprises a collection and/or analysis unit 40 and a telecommunication system 42 able to transfer data measured by the seismic receivers 32 to the collection and/or analysis unit 40 and from the collection and/or analysis unit 40 to an external station (not shown).

For example, the telecommunication system 42 comprises at least one antenna 41 installed in each seismic source area 31 and at least one antenna 43 installed in each base camp 34.

The external station may be located at a main camp (not shown). The main camp advantageously comprises facilities for collecting data, as well as a main computing unit, and/or a control center.

Typically, the seismic receivers 32, 33 are split in two groups: the seismic receivers 32 positioned in the seismic source areas 31 and the seismic receivers 33 positioned out of the seismic source areas 31.

Each seismic receiver 32, 33 is able to record the waves generated by each seismic source 30 and the reflected waves at the interfaces of the layers of geological formation 22.

The seismic receiver 32, 33 is for example a geophone able to measure the velocity of the direct and reflected waves.

Advantageously, the seismic receiver 32, 33 comprises at least one geophone, in particular three geophones and/or an accelerometer.

In a variant, the seismic receiver 32 comprises a distributed acoustic sensing (DAS) or a distributed vibration sensing (DVS) using fiber optic cables.

Each seismic receiver 32, 33 is partially introduced in the ground so as to ensure a functional coupling with the ground.

The seismic receivers 32 positioned in the seismic source areas 31 are for example transported by a team of operators from a base camp 34 and installed manually in the seismic source area 31.

In the example of FIG. 1 and FIG. 2, the seismic receivers 33 positioned out of the seismic source areas 31 are transported to their locations and dropped in the ground from airborne platforms 38.

The airborne platforms 38 typically take off from a base camp 34.

For example, the airborne platform 38 is a UAV (for Unmanned Aerial Vehicle).

Each receiver 33 has for example the shape of a dart adapted to be introduced in the ground. In a variant, the seismic receivers 32 has the shape of a ball or/and a parallel pipe shape.

The seismic sources 30 and the seismic receivers 32, 33 are for example transported to the base camps 34 using a vehicle such as a ground vehicle, e.g. a truck, an unmanned ground vehicle (UGV) or an airborne vehicle, e.g. a helicopter.

Typically, the density of seismic receivers 32 in the seismic source area 31 is greater than the density of seismic receivers 33 out of the seismic source area 31.

Typically, the density of seismic receivers 33 is for example between 10 seismic receivers 33 per $km^2$ and 1000 seismic receivers 33 per $km^2$, in particular between 300 seismic receivers 33 per $km^2$ and 500 seismic receivers 33 per $km^2$, notably 400 seismic receivers 33 per $km^2$.

Typically, the method comprises positioning a plurality of seismic sources 30 in each seismic source areas 31.

Typically, the seismic sources 30 may be positioned either before the seismic receivers 32, 33 or after the seismic receivers 32, 33.

Advantageously, the seismic sources 30 are positioned symmetrically one to each other according to at least an axis formed by a plurality of seismic receivers.

Typically, the method also comprises positioning two sets of receivers 32 respectively along two profiles, advantageously perpendicular, in the seismic source area 31.

Figure 3:
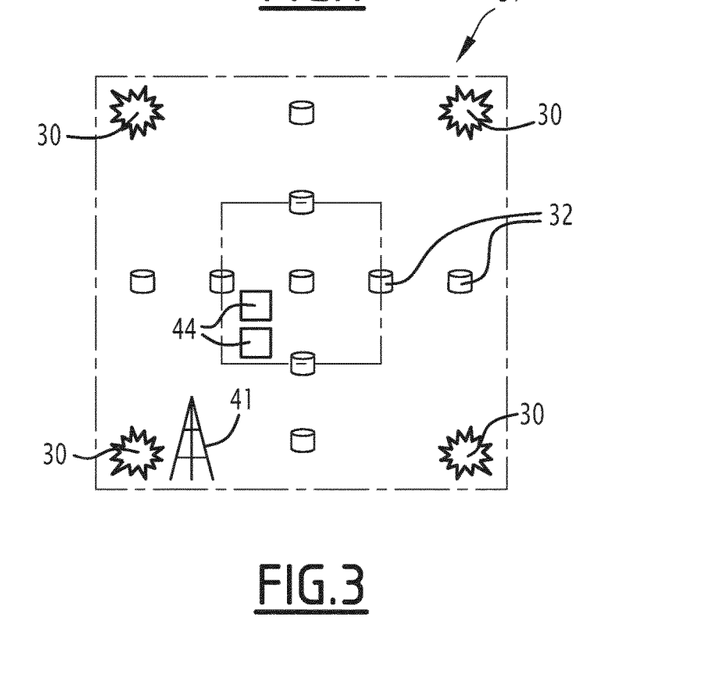
FIG. 3 and FIG. 4 are representations of two embodiments of a seismic source area.
Figure 4:
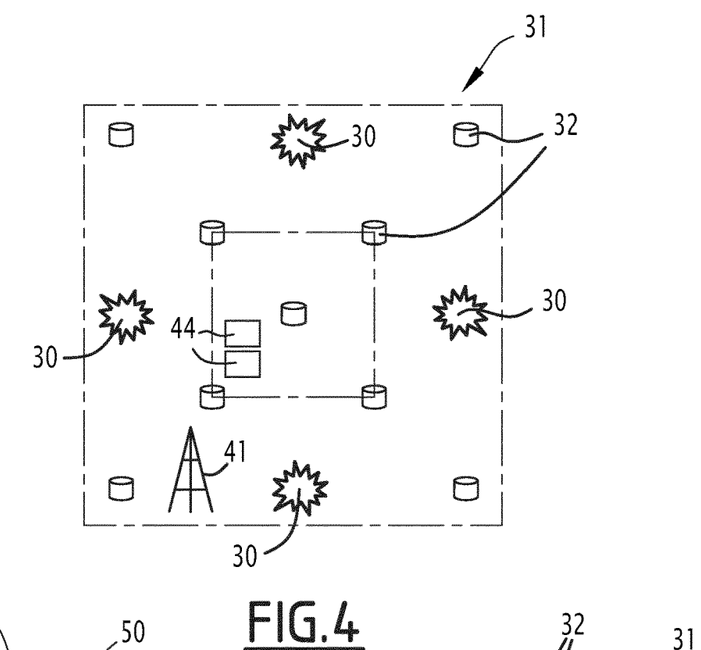

FIG. 3 and FIG. 4 depict two examples for positioning the seismic sources 30 and the seismic receivers 32 according to a geometric pattern in the seismic source area 31.

In both examples, the seismic source area 31 substantially has a square shape.

For example, as presented in FIG. 3, four seismic sources 30 are disposed in the four corners of the seismic source area 31 and nine seismic receivers 32 are disposed according to a geometric pattern forming a plus sign or "+".

In the example of FIG. 4, four seismic sources 30 are disposed in the center of each side of the seismic source area 31 and the seismic receivers 32 are disposed along the diagonals of the seismic source area 31 according to a geometric pattern forming a crossing sign or "×".

In a variant, not represented, the seismic receivers 32 are disposed in the seismic source area 31 according to another geometric pattern such as a circle, a diamond.

In a variant, the seismic receivers 32 are randomly spread in the seismic source area 31. Their geographic positions are then well determined.

In another variant, not represented, the seismic receivers 32 are disposed in the seismic source area 31 along at least two parallel profiles.

Advantageously, the method also comprises measuring with the plurality of seismic receivers 32 at least one second type of ground vibrations induced by a mechanical source different from the or from each seismic source 30.

Typically, the method according to the invention comprises transmitting in real-time the second type of ground vibrations measurements to a base camp 34, using the communication antenna 41 installed in the seismic source area 31.

For example, the mechanical source is a drilling tool used during the setup of one of the seismic sources 30 in the seismic source area 31, before the beginning of the seismic survey.

In a variant or in addition, the second ground vibrations may be induced by a drilling tool used during the setup of the seismic sources 30 in at least one second seismic source area 31.

Typically, the method further comprises analyzing the ground vibrations induced by the drilling tool to determine a physical parameter of the subsurface 20.

The analysis is for example an ambient passive seismic imaging technique known from the prior art.

For example, the determined physical parameter of the subsurface 20 is the S-wave velocity variations with depth and/or the P-wave velocity variations with depth.

In a variant, the determined physical parameter of the subsurface 20 is the density.

In an advantageous example, the method also comprises the determination of the geological interfaces of the layers of geological formations 22 beneath the seismic source area 31.

The determined physical parameter is typically used during the processing of the global seismic survey data as a priori information. This information improves the quality of the image of the subsurface 20 obtained after the processing of the seismic data.

For example, the determined physical parameter is used to build a velocity model which is used for the processing of the seismic data (ex: migration) as a large-scale first order starting model.

Typically, the obtained velocity model may be used in the real-time processing of the seismic data and/or in the pre-processing of the seismic data.

The method advantageously comprises measuring at least one additional physical parameter of the ground with a plurality of additional sensors 44 installed in the seismic source area 31.

For example, the plurality of additional sensors 44 are magneto-telluric sensors and the method further comprises calculating a large-scale electrical conductivity model based on the magneto-telluric measurements provided by said magneto-telluric sensors.

Magneto-telluric sensors measure the natural geomagnetic and geoelectric field variation on the surface of the ground.

The depth of investigation of the magneto-telluric method ranges from several hundred meters below the ground, for example 300 m to several kilometers, for example 5 km, depending on the frequencies of the measured signals and the corresponding measuring periods.

The large-scale electrical conductivity model is typically used during the processing of the global seismic survey data as a priori information.

In addition, the large-scale electrical conductivity model may be used jointly with the seismic image so as to interpret the results in terms of oil and gas reservoir structures.

Advantageously, the method also comprises transmitting in real-time the additional sensors data to a base camp 34, using the communication antenna 41 installed in the seismic source area 31.

The method also advantageously comprises monitoring the seismic source 30 signature using the plurality of seismic receivers 32 during the acquisition of the seismic survey.

Typically, the monitored data comprise the full waveforms of the seismic signal.

The method typically comprises analyzing the spectral content of the seismic source 30 signature.

Typically, the monitored data may be used in the global processing of the seismic dataset so as to improve the quality of the image of the subsurface 20.

The method may also comprise transmitting in real-time the monitored data to a base camp 34, using the communication antenna 41 installed in the seismic source area 31.

Advantageously, the mechanical source is a human 46 and/or an animal and/or a vehicle in contact with the ground and the method comprises measuring with the same plurality of seismic receivers 32 located in the seismic source areas 31 the ground vibrations induced by the steps of the human 46 or of the animal walking in the area of interest 10 and/or by a vehicle in contact with the ground in the region of interest 10.

Typically, the ground vibrations are surface waves and/or S waves.

The method then comprises for example determining the presence and/or the location of the human 46 and/or the animal and/or the vehicle in the region of interest 10, for example by using a triangulation method.

Figure 5:
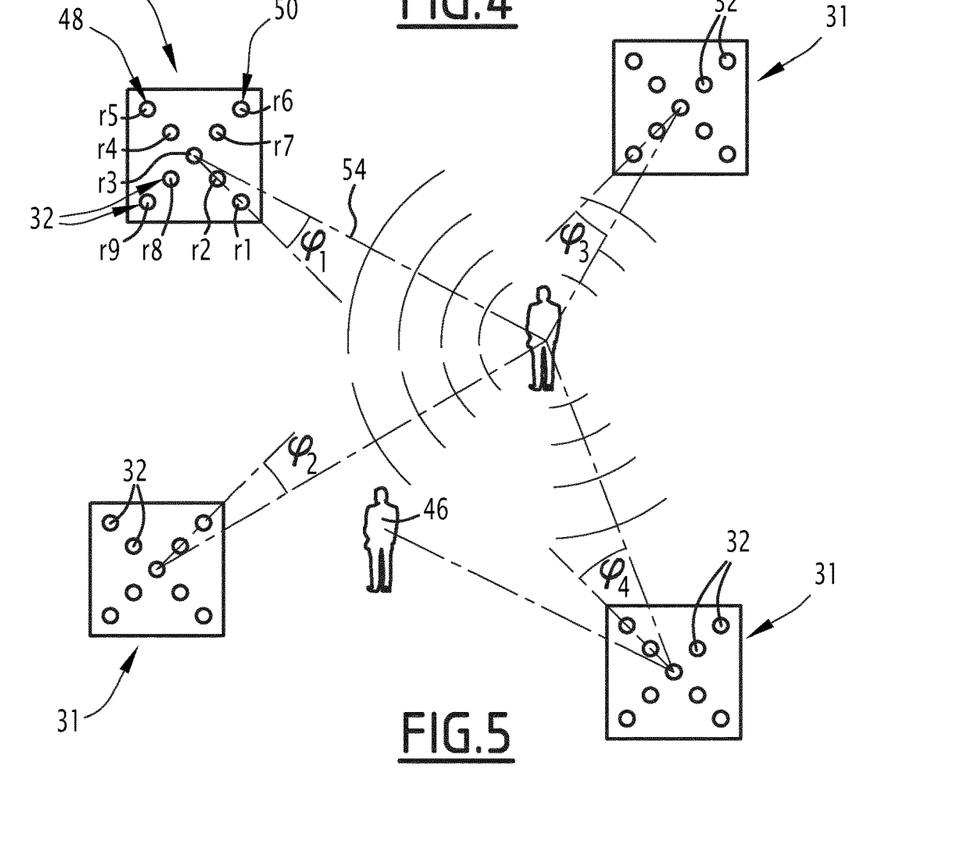
FIG. 5 is a sketch showing a step of human detection of the method according to the invention.

Typically, the determination step comprises analyzing a same vibration event, for example a ground vibration induced by a footstep, with at least two sets of seismic receivers 32 located in several corresponding seismic source areas 31 (FIG. 5).

In the example of FIG. 5, the seismic source area 31 are configured according to the geometric pattern presented in FIG. 4 wherein the seismic receivers 32 are disposed along a first and a second perpendicular profiles 48, 50, corresponding to the diagonals of the seismic source area 31.

The location of the human 46 and/or the animal is typically determined based on the time delay in the recording of the source event (ex: human footstep) by each seismic receiver 32 along the first profile 48 or the second profile 50 and based on an average wave propagation velocity V of the waves in the subsurface 20 of the considered seismic source area 31.

Typically, for each first and second profile 48, 50, the time delays are determined using cross-correlations between the signals measured by the various seismic receivers 32 of the considered profile 48, 50.

For example, the average local propagation velocity of the seismic source area 31 is measured independently during the set-up of the seismic receivers 32 in the seismic source area 31.

The propagation velocity is obtained for example by activating a light-weight source such as a hammer and by recording the signal obtained by at least one seismic receiver 32.

Figure 6:
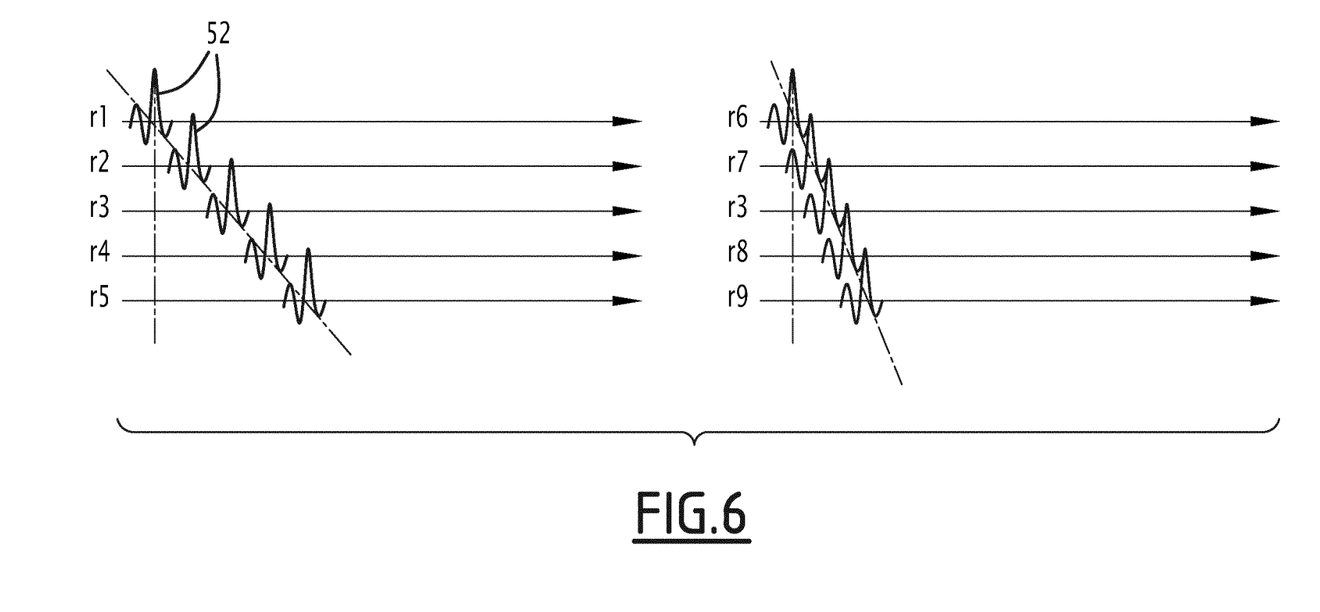
FIG. 6 are recordings of a ground vibration induced by a human footstep measured with seismic receivers located in a seismic source area.

FIG. 6 presents an example of seismic signals 52 induced by a footstep of a human 46 walking in the area of interest 10 measured respectively by the seismic receivers 32 $r_1$, $r_2$, $r_3$, $r_4$, $r_5$ along the first profile 48 and by the seismic receivers 32 $r_6$, $r_7$, $r_3$, $r_8$, $r_9$ of the second profile 50.

For each first and second profile 48, 50, the maxima of amplitude of the seismic signal 52 are aligned along a line for which the slope is respectively equal to Va/cos $\phi_1$ and Vb/sin $\phi_1$. Va and Vb are respectively the average wave propagation velocity along the first profile 48 and the second profile 50, and $\varphi_1$ is the angle between the direction of the first profile 48 and the direction of an axis 54 passing through the intersection of the first and the second profiles 48, 50 and the location of the human 46 in the area of interest 10.

The method allows determining the direction (also referred as the azimuth) of the detected human 46.

The above described steps are repeated for several seismic source areas 31, at least two seismic source areas 31, preferably at least three seismic source areas 31, to obtain an uncertainty information (i.e. an uncertainty triangle) and the location of the human 46 is determined.

In a variant, if the seismic receivers 32 are randomly spread in the seismic source area 31 and methods of beamforming are used to determine the location of the human 46 and in particular the moving direction of the human 46 with an improved resolution.

Typically, the determination of the presence and/or the location of the human 46 and/or the animal and/or the vehicle in the region of interest 10 is based for example on the intensity of the ground vibrations, the spectral content of the ground vibrations, the frequency of the ground vibrations.

Advantageously, the method for determining the presence and/or the location of the human 46 and/or the animal and/or the vehicle in the region of interest 10 allows determining if the human 46 and/or the animal and/or the vehicle are moving and the direction of moving based in particular on the periodicity of the seismic signal. Advantageously, the determination of the presence and/or the location of the human 46 and/or the animal and/or the vehicle in the region of interest 10, is implemented in real-time, preferably during the dropping of the seismic receivers 33 by the airborne vehicles 38 in the area of interest 10.

The method may also comprise repeating the steps of determination of the presence and/or the location of the human 46 and/or the animal and/or the vehicle at a given time spacing so as to monitor the presence and/or the location of the human 46 and/or the animal and/or the vehicle in the region of interest 10.

For example the given time spacing is comprised between 1 s and 1 minute, preferably between 2 s and 5 s.

For example, the steps of determination of the presence and/or the location of the human 46 and/or the animal and/or the vehicle are performed locally in the seismic source area 31 using a determination unit (not represented).

In a variant, the steps of determination of the presence and/or the location of the human 46 and/or the animal and/or the vehicle are performed remotely, for example in a base camp 34.

The method then comprises transmitting in real-time the vibrations measurements induced by the human 46 and/or the animal and/or the vehicle to the base camp 34 using the communication antenna 41 installed in the seismic source area 31.

The method comprises allowing the dropping of seismic receivers 33 only when no human 46 and/or animal and/or vehicle is detected by the seismic receivers 32 in the seismic source area 31 and/or preventing the dropping of seismic receivers 33 only when a human 46 and/or an animal and/or a vehicle is detected by the seismic receivers 32 in the seismic source area 31.

The method advantageously comprises triggering a sound and/or light alarm when the presence of the human 46 and/or the animal and/or the vehicle is detected in the region of interest 10. In an embodiment, the sound and/or light alarm is triggered from an airborne vehicle 36 or an airborne platform 38.

Advantageously, the method comprises stopping the positioning of the plurality of seismic receivers 33 positioned out of the seismic source area 31 when the presence of the human 46 and/or the animal and/or the vehicle is detected in the region of interest 10.

In a variant, the second type of ground vibrations is induced by the drop of the seismic receivers 33.

The method may then comprise confirming the seismic receivers 33 have reached the ground and are not blocked in the vegetation 14.

The method may also comprise determining the location of the drop points of the seismic receivers 33.

The method may also comprise using the impact of the seismic receivers 33 as seismic sources and for example using them for subsurface characterization.

In another variant, the method comprises using the dropped seismic receivers 33 to increase the density of seismic receivers 32 used for monitoring the presence and/or the location of human 46 and/or animal and/or vehicle in the region of interest 10.

The method may comprise positioning in a first step the seismic receivers 33 in the sky holes 28 and then adding additional seismic receivers 33 in the area of interest 10 to increase the reliability of the monitoring of the presence and/or of the location of human 46 and/or animal and/or vehicle in the region of interest 10.

In another variant, the method comprises monitoring the presence and/or the location of a human 46 and/or animal and/or vehicle next to a seismic source area 31 before activating each seismic source 30.

Advantageously, when a human and/or animal and/or a vehicle are detected, the seismic sources activation is stopped.

In another variant, the method according to the invention advantageously includes a global safety clearance which may comprise other ground detectors and/or fixed aerial presence detector, and/or flying presence detectors potentially used in combination.

The method for acquiring a seismic dataset according to the invention is particularly advantageous because it allows using the seismic receivers 32 positioned in the seismic source areas 31 for several purposes such as collecting additional measurements to improve the quality of the processing of the seismic dataset of the survey, or monitoring the presence of humans 46 and/or animals and/or vehicles in the area of interest 10 to prevent hazards on the humans, the animals or the vehicles in the area of interest 10. In this way, by using the same seismic receivers 32 for the monitoring network, instead of installing additional sensors in other locations of the area of interest 10, the impact on the environment is reduced.

As indicated above, each seismic source 30 is configured to generate seismic energy used to perform seismic surveys for example for oil and gas exploration. This seismic energy generates the first type of ground vibrations.

The first type of ground vibrations is generated at a known time and from a known location. On the contrary, the second type of ground vibrations is very often generated neither at a known time, nor from a precise known location.

The second type of ground vibrations can be differentiated from the first type of ground vibrations for example by the time at which they are sensed and analyzed. For example, each time a seismic source 30 is triggered, a predetermined time interval is defined in which the signal sensed by the receivers 32 is considered to result from the first type of ground vibrations.

The signal sensed by the receivers 32 after the predetermined time interval and before another source 30 is triggered, is sensed and analyzed as resulting from a second type of ground vibrations induced by a mechanical source different from the or from each seismic source 30.

Alternatively or in addition, the geographical direction from which the vibration is sensed by the receivers 32 can be used to sort between the first type of vibrations and the second type of vibrations.

For example, if the geographical direction from which the signal is sensed by the receivers 32 corresponds to a geographical direction from which one source 30 has been triggered, the signal may be considered to correspond to the first type of vibrations.

If the geographical direction from which the signal is sensed by the receivers 32 is different from a geographical direction from which one source 30 has been triggered, the signal may be considered to correspond to the second type of vibrations.

The invention claimed is:

1. A method for acquiring a seismic dataset for a seismic survey over a region of interest, said method comprising:
    providing at least one seismic source in a seismic source area of the region of interest, the at least one seismic source comprising at least one of an explosive, a hammer, or a vibrator;
    providing a plurality of seismic receivers in said seismic source area, the plurality of seismic receivers comprising at least three seismic receivers;
    measuring, with the plurality of seismic receivers, a first ground vibration induced in a subsurface of the region of interest by the at least one seismic source, the at least one seismic source being able to generate waves which propagate in the subsurface, the first ground vibration being used to prepare the seismic dataset;
    measuring, with the plurality of seismic receivers, at least one second ground vibration induced by a mechanical source different from the at least one seismic source, the mechanical source being chosen between a human, an animal and a vehicle in contact with a ground of the region of interest, wherein the at least one second ground vibration is not used to prepare the seismic dataset, the first ground vibration and the at least one second ground vibration being differentiated based on the intensity of the ground vibrations, the spectral content of the ground vibrations, the frequency of the ground vibrations, only the first ground vibration being included into the seismic dataset;
    analyzing the at least one second ground vibration to determine at least one information relevant to a location of the mechanical source in the region of interest; and
    monitoring the location of the mechanical source in real time in the region of interest, said monitoring of the location of the mechanical source in real time including iteratively performing a method of determining the location of the mechanical source as the mechanical source moves in the region of interest, wherein the method of determining the location of the mechanical source comprises:
        recording at least one same event of the at least one second ground vibration resulting from a movement of the mechanical source on the ground in the region of interest, at the plurality of seismic receivers,
        comparing a time at which each of the plurality of seismic receivers recorded the at least one same event to obtain a time delay, and
        determining the location of the mechanical source based on the time delay, and
        preventing deployment of an additional seismic source, the additional seismic source comprising at least one of an explosive, a hammer, or a vibrator, in the seismic source area of the region of interest when the location of the mechanical source is determined to be within the region of interest.

2. The method according to claim 1, further comprising positioning seismic receivers out of the seismic source area, the density of the seismic receivers in the seismic source area being greater than the density of seismic receivers out of the seismic source area.

3. The method according to claim 1, further comprising triggering an alarm when a presence of the mechanical source is detected in the region of interest.

4. The method according to claim 1 further comprising positioning seismic receivers out of the seismic source area, the density of the seismic receivers in the seismic source area being greater than the density of seismic receivers out of the seismic source area, and comprising stopping the positioning of the plurality of seismic receivers positioned out of the seismic source area when a presence of the mechanical source is detected in the region of interest.

5. The method according to claim 4, wherein the seismic receivers positioned out of the seismic source areas are transported to their locations and dropped in the ground from airborne platforms.

6. The method according to claim 1, further comprising inducing a seismic signal with the at least one seismic source and monitoring at least one seismic source signature using the plurality of seismic receivers during acquisition of the seismic dataset.

7. The method according to claim 1, further comprising positioning at least two seismic sources in the seismic source area and positioning the plurality of seismic receivers according to a geometric pattern contained in the seismic source area.

8. The method according to claim 7, in which the seismic source area has a square or a rectangular shape having four corners and said method further comprising positioning a seismic source in each corner of the seismic source area and positioning two plurality of seismic receivers along at least two axes contained in the seismic source area, the axes being axes of symmetry of the seismic source area.

9. The method according to claim 8, in which at least one seismic receiver is provided at each midpoint between the corners of the seismic source area.

10. The method according to claim 1, further comprising measuring at least one additional physical parameter of the ground with a plurality of additional sensors installed in the seismic source area.

11. The method according to claim 10, in which the plurality of additional sensors are magneto-telluric sensors and the method further comprising calculating a large-scale electrical conductivity model based on magneto-telluric measurements provided by the magneto-telluric sensors.

12. The method according to claim 10, further comprising transmitting in real-time the additional physical parameter of the ground to a base camp located in the region of interest, using at least one communication antenna installed in the seismic source area.

13. The method according to claim 1, further comprising transmitting in real-time one or more of the first ground vibration measurements and the at least one second ground vibration measurements to a base camp located in the region of interest, using at least one communication antenna installed in the seismic source area.

14. The method according to claim 1, wherein the monitoring the location of the mechanical source in the region of interest is based on an intensity of at least an event of ground vibration or a spectral content of the at least an event of ground vibration or a frequency of the event of ground vibration.

15. The method according to claim 1, wherein the plurality of seismic receivers are formed by a first series of seismic receivers arranged according to a first profile and a second series of seismic receivers arranged according to a second profile, the first profile intercepting the second profile, wherein the method of determining the location of the mechanical source as the mechanical source moves in the region of interest further comprises:
    computing first time delays in the recording of the same event between the seismic receivers of the first series and computing second time delays in the recording of the same event between the seismic receivers of the second series.

16. The method according to claim 1, wherein the at least one second ground vibration is a surface wave generated by the mechanical source in contact with the ground.

17. The method according to claim 1, further comprising differentiating the first ground vibration and the at least one second ground vibration based on one of the time at which the ground vibrations are sensed and/or based on a geographical direction from which the ground vibrations are sensed.

18. The method according to claim 1, wherein the location of the mechanical source in the region of interest is determined by using a triangulation method.

19. A method for acquiring a seismic dataset over a region of interest, said method comprising:

providing at least four seismic sources in a seismic source area of the region of interest, the at least four seismic sources each comprising at least one of an explosive, a hammer, or a vibrator;

providing a plurality of seismic receivers in the seismic source area according to a geometric pattern contained in the seismic source area, in which the seismic source area has a square or a rectangular shape having four corners, wherein positioning the plurality of seismic receivers comprises positioning a seismic source in each corner of the seismic source area and positioning the plurality of seismic receivers along at least two axes contained in the seismic source area, the axes being axes of symmetry of the seismic source area, measuring a first ground vibration induced in a subsurface of the area of interest by the at least one of the four seismic sources with the plurality of seismic receivers, the first ground vibration being used to prepare the seismic dataset;

measuring, with the plurality of seismic receivers, at least one second ground vibration induced by a mechanical source different from each of the at least four seismic sources, the mechanical source being chosen between a human, an animal and a vehicle;

analyzing the at least one second ground vibration to determine at least one information relative to a location of the mechanical source in the region of interest;

monitoring the location of the mechanical source in real time in the region of interest, said monitoring of the location of the mechanical source in real time including recording at least a same event of the at least one second ground vibration resulting from a movement of the mechanical source on the ground in the region of interest, at the plurality of seismic receivers and analyzing time delays in the recording of the same event between the plurality of seismic receivers.

* * * * *